United States Patent
Thatcher

[15] 3,685,889
[45] Aug. 22, 1972

[54] SUNGLASSES HAVING ADJUSTABLE LENSES

[72] Inventor: Robert H. Thatcher, Hatchville, Mass. 02551

[22] Filed: March 23, 1971

[21] Appl. No.: 127,138

[52] U.S. Cl. .......................351/47, 351/41, 351/44
[51] Int. Cl. ..........................G02c 9/00, G02c 7/10
[58] Field of Search..........351/47, 48, 57, 58, 41, 44

[56] References Cited

UNITED STATES PATENTS

| | | | |
|---|---|---|---|
| 2,901,752 | 9/1959 | Granger | 351/47 |
| 2,107,103 | 2/1938 | Catron | 351/44 |

FOREIGN PATENTS OR APPLICATIONS

| | | | |
|---|---|---|---|
| 667,640 | 3/1952 | Great Britain | 351/47 |

*Primary Examiner*—David Schonberg
*Assistant Examiner*—Robert L. Sherman
*Attorney*—Lawrence G. Peterson

[57] ABSTRACT

The lenses of the sunglasses are adjustable in the frame for the purpose of moving the same from a normal position in front of the eyes downwardly to a position over the cheeks in an area immediately below the eyes whereby to prevent glare from the cheeks into the eyes.

3 Claims, 5 Drawing Figures

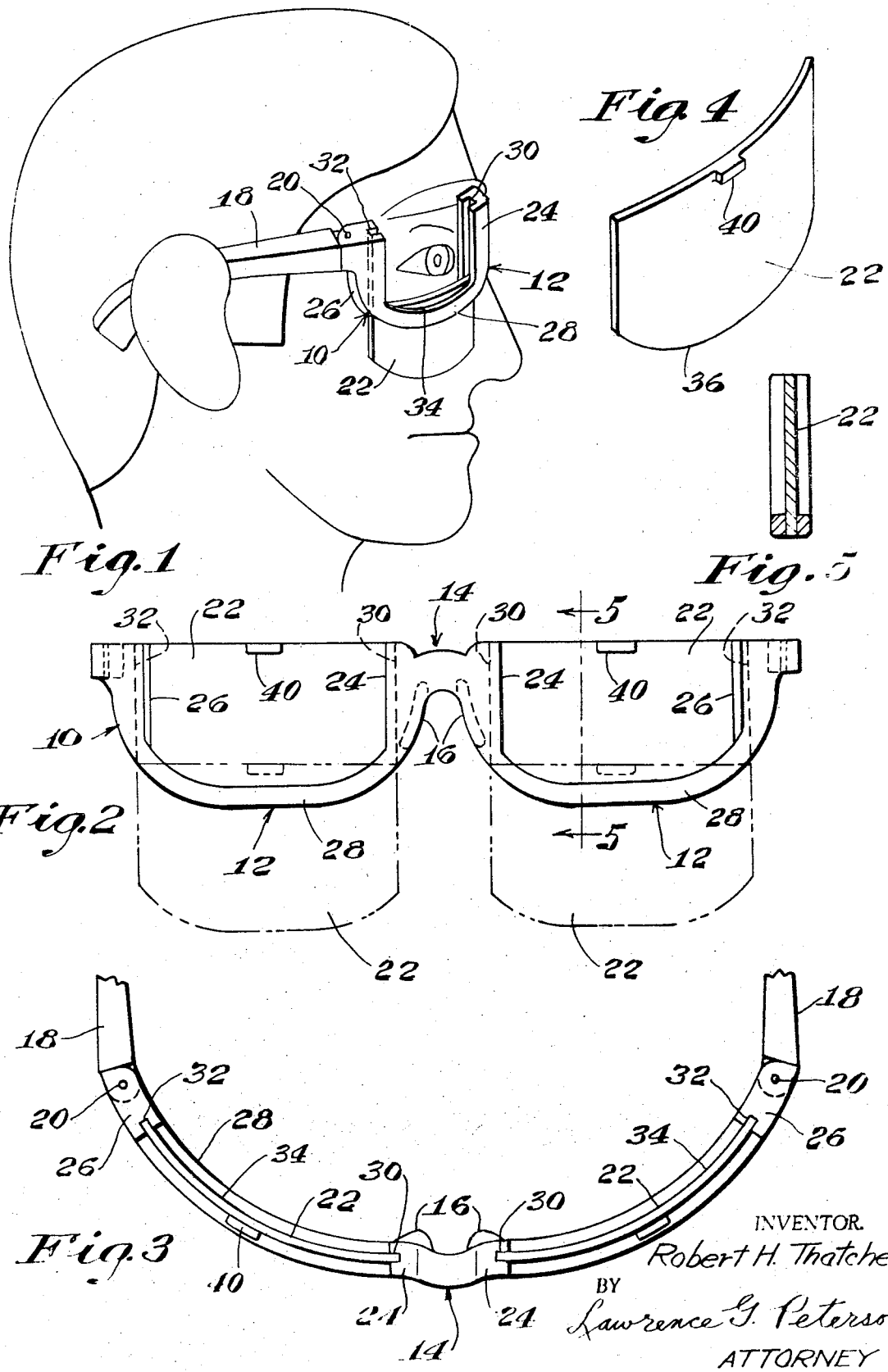

SUNGLASSES HAVING ADJUSTABLE LENSES

This invention relates to sunglasses and more particularly to sunglasses having adjustable lenses.

The invention has for an object to provide novel and improved sunglasses of the character specified having adjustable lenses movable from the normal line of vision downwardly to a position over the cheeks in the area immediately below the eyes for the purpose of reducing glare from the cheeks which might otherwise be reflected into the eyes.

The invention has for another object to provide novel and improved sunglasses of the character specified characterized by having resilient plastic lenses arranged to be frictionally retained in the frame in any position of adjustment in a novel and efficient manner.

With these general objects in view, and such others as may hereinafter appear, the invention consists in the sunglasses having adjustable lenses as hereinbefore described and particularly defined in the claims at the end of this specification.

In the drawings illustrating the preferred embodiment of the invention:

FIG. 1 is a profile view of a person wearing the sunglasses embodying the present invention;

FIG. 2 is a front elevation of the sunglasses;

FIG. 3 is a plan view of the glasses shown in FIG. 2;

FIG. 4 is a perspective view of a flexible plastic lens used in the present sunglasses; and, FIG. 5 is a view in vertical cross section as taken on the line 5—5 of FIG. 2.

The present invention contemplates novel sunglasses in which the lenses are adjustably mounted in the lens holders or rims of the frame and which are adapted to be moved from a normal position in front of the eyes to a lowered position over the cheeks in the area immediately below the eyes for the purpose of absorbing reflected light whereby to reduce the glare from the cheeks which might otherwise be reflected from the cheeks into the eyes. In practice, the lens frame may comprise a molded plastic material having grooves and slots formed in the lens holding rims of the frame and arranged to receive flexible plastic lenses movable from a normal position to a lowered position.

Applicant is aware that the prior art includes ophthalmic mountings wherein the lenses are movable in grooves formed in the frame, such prior structure permitting upward movement of the lenses for various purposes such as cleaning, replacement or interchangeability of the lenses. None of such prior patentees contemplated movement of the lenses downwardly in the frame for the purpose specified in accordance with the present invention.

Referring now to the drawings, 10 represents a molded plastic eyeglass frame having rim portions indicated generally at 12; a connecting bridge 14 having a nose piece 16; conventional side bows 18 pivotally connected to the frame, as indicated at 20; and flexible plastic lenses 22 mounted for downward movement in the rims 12. The lenses may be suitable tinted in any usual or preferred manner for protection against the sun's rays.

As herein shown, each rim portion 12 includes inner and outer side bars 24, 26 respectively, and a lower bar 28, the rims being free of a top bar. The side bars 24, 26 are provided with grooves 30, 32 along their inner faces which extend through the lower bar 28, the latter being provided with through slots 34 in communication with the grooves.

In operation, the flexible plastic lenses 22 are inserted into the grooves 30, 32 from the top and are then pushed down with the fingers until the top edges of the lenses are aligned with the tops of the side bars 24, 26 at which time the curved lower edges 36 of the lenses will be flush with the curved configuration of the lower bar 28. When inserting the lens it is flexed slightly with the side edges of the lens directed into the grooves so that when the lens is released from its flexed condition it will be frictionally retained in the grooves.

When thus assembled, the lenses are in their normal position, that is, in the line of vision for use in the usual manner, such as when driving in direct sunlight with little or no reflected light from exterior objects, or, for night driving to shield the eyes from the glare of headlights or other intense illumination. At other times, when the sun is at an angle, such that glare from exterior objects onto the cheeks is reflected into the eyes, the lenses are moved downward by pressure of the fingers to a position over the cheeks in an area immediately below the eyes whereby to eliminate or substantially reduce glare in the manner of a baseball or football player who darkens his cheeks in the area below the eyes when playing in sunlight. In practice, it was found that this expedient is most effective when driving an automobile whereby reflections from the car hood; from the cars in the road ahead; from the road itself; or like reflections striking the cheeks are absorbed or reduced to a minimum.

In practice, the rims 12 of the sunglasses are disposed at a suitable angle relative to the side bows 18 such as to permit free downward movement of the lenses over the protruding cheek areas. Also, the friction fit of the lenses permits the same to be retained in any lowered or intermediate position of adjustment desired. As herein illustrated, the upper edge of each lens is provided with at least one projection 40 to prevent withdrawal of the lenses through the slots 34 in the lower bars 28. After use in a lowered position, the lenses are returned to their normal position by pushing upward with the fingers on the bottom edges of the lenses.

From the above description, it will be seen that the present structure of sunglasses having adjustable lenses is adapted to permit lowering of the lenses over the cheek areas immediately below the eyes so as to eliminate or reduce to a minimum any reflections from the cheeks into the eyes in a simple and efficient manner.

Having thus described the invention, what is claimed is:

1. In a pair of sunglasses, in combination, a frame including a pair of lens holding rims, a connecting bridge member, side bows, and lenses mounted in said rims, each of said rims having inner and outer side bars and a lower bar, the upper portion of each rim being open and free of an upper bar, each of said side bars having lens receiving grooves on their inner faces, the lower bar having a through slot in communication with said grooves for adjustably receiving a lens, which lens is frictionally engaged in said grooves and slots, retaining the lens in any desired position of adjustment and permitting sliding movement of the lenses vertically in the grooves and through said slots from a normal position in the line of vision to a lowered position over the cheeks in an area immediately below the eyes.

2. A pair of sunglasses as defined in claim 1 wherein the lenses are flexible and are of a width relative to the distance between the grooves such as to permit the same to be flexed when inserting the lenses in the rims and to effect frictional engagement therewith when released.

3. A pair of sunglasses as defined in claim 1 wherein the upper edges of the lenses are provided with projections to prevent withdrawal of the same through the slots in the lower bars.

* * * * *